(12) United States Patent
Stork et al.

(10) Patent No.: US 7,728,073 B2
(45) Date of Patent: Jun. 1, 2010

(54) THERMOPLASTIC MOULDING COMPOUNDS EXHIBITING IMPROVED CHEMICAL RESISTANCE

(75) Inventors: Martin Stork, Mannheim (DE); Martin Weber, Maikammer (DE); Axel Gottschalk, Neustadt (DE); Sven Riechers, Speyer (DE); Norbert Güntherberg, Speyer (DE); Wolfgang Fischer, Walldorf (DE); Ludger Leber, Dannstadt-Schauernheim (DE); Peter Ittemann, Lampertheim (DE); Stephan Jüngling, Mannheim (DE)

(73) Assignee: BASF SE, Ludwigshafen (DE)

( * ) Notice: Subject to any disclaimer, the term of this patent is extended or adjusted under 35 U.S.C. 154(b) by 575 days.

(21) Appl. No.: 10/596,344

(22) PCT Filed: Dec. 14, 2004

(86) PCT No.: PCT/EP2004/014227

§ 371 (c)(1),
(2), (4) Date: Jun. 9, 2006

(87) PCT Pub. No.: WO2005/059029

PCT Pub. Date: Jun. 30, 2005

(65) Prior Publication Data

US 2007/0167573 A1 Jul. 19, 2007

(30) Foreign Application Priority Data

Dec. 16, 2003 (DE) ................ 103 59 358

(51) Int. Cl.
*C08L 51/00* (2006.01)
*C08L 51/04* (2006.01)
*C08L 51/06* (2006.01)

(52) U.S. Cl. .............................. 525/78; 525/80; 525/86
(58) Field of Classification Search ............ 525/78, 525/80, 86

See application file for complete search history.

(56) References Cited

U.S. PATENT DOCUMENTS 6,087,449 A  7/2000  Tiefensee et al.

FOREIGN PATENT DOCUMENTS

WO    WO-97/08241    3/1997

*Primary Examiner*—Jeffrey C Mullis
(74) *Attorney, Agent, or Firm*—Connolly Bove Lodge & Hutz LLP

(57) ABSTRACT

The present invention relates to thermoplastic molding compositions comprising a mixture of
(A) from 30 to 69% by weight, based on the sum of components (A), (B) and (C), of a methyl methacrylate polymer,
(B) from 30 to 69% by weight, based on the sum of components (A), (B) and (C), of a copolymer obtainable by polymerizing a styrenic monomer and a vinyl cyanide, and
(C) from 1 to 40% by weight, based on the sum of components (A), (B) and (C), of a graft copolymer obtainable from
(C1) from 60 to 90% by weight, based on (C), of a core obtainable by polymerizing a 1,3-diene and a styrenic monomer,
(C2) from 5 to 20% by weight, based on (C), of a first graft shell, and
(C3) from 5 to 20% by weight, based on (C), of a second graft shell composed of an alkyl (meth)acrylate polymer, with the proviso that the ratio of (C2) to (C3) is in the range from 2:1 to 1:2.

14 Claims, No Drawings

THERMOPLASTIC MOULDING COMPOUNDS EXHIBITING IMPROVED CHEMICAL RESISTANCE

This application is a National Stage entry under 35 U.S.C. §371 of PCT/EP2004/014227 filed on Dec. 14, 2004. International application PCT/EP2004/014227 claims priority to German application 10359358.6 filed on Dec. 16, 2003, the entire of contents of each of the above applications are incorporated by reference herein.

The present invention relates to thermoplastic molding compositions comprising a mixture of
- (A) from 30 to 69% by weight, based on the sum of components (A), (B) and (C), of a methyl methacrylate polymer obtainable by polymerizing a mixture consisting of
  - (A1) from 90 to 100% by weight, based on (A), of methyl methacrylate, and
  - (A2) from 0 to 10% by weight, based on (A), of a $C_1$-$C_8$-alkyl ester of acrylic acid, and
- (B) from 30 to 69% by weight, based on the sum of components (A), (B) and (C), of a copolymer obtainable by polymerizing a mixture consisting of
  - (B1) from 75 to 88% by weight, based on (B), of a styrenic monomer and
  - (B2) from 12 to 25% by weight, based on (B), of a vinyl cyanide and
- (C) from 1 to 40% by weight, based on the sum of components (A), (B) and (C), of a graft copolymer obtainable from
  - (C1) from 60 to 90% by weight, based on (C), of a core obtainable by polymerizing a monomer mixture consisting of
    - (C11) from 65 to 90% by weight, based on (C1), of a 1,3-diene and
    - (C12) from 10 to 35% by weight, based on (C1), of a styrenic monomer
  and
  - (C2) from 5 to 20% by weight, based on (C), of a first graft shell and
  - (C3) from 5 to 20% by weight, based on (C), of a second graft shell obtainable by polymerizing a monomer mixture consisting of
    - (C31) from 70 to 98% by weight, based on (C3), of a $C_1$-$C_8$-alkyl ester of methacrylic acid and
    - (C32) from 2 to 30% by weight, based on (C3), of a $C_1$-$C_8$-alkyl ester of acrylic acid
  and
- (D) if desired, customary additives in amounts of up to 20% by weight, based on the sum of components (A), (B) and (C),
with the proviso that the weight ratio of (C2) to (C3) is in the range from 2:1 to 1:2.

The present invention further relates to a process for producing the inventive thermoplastic molding compositions, to their use and to the moldings obtainable therefrom.

WO 97/08241 discloses molding compositions which are composed of a rigid methyl methacrylate polymer, a rigid styrenic-vinyl cyanide polymer and a flexible graft copolymer comprising an elastomeric graft core, a first graft shell composed of a styrenic-alkyl methacrylate polymer and a second graft shell composed of an alkyl (meth)acrylate polymer. These molding compositions feature good impact strength, high flowability, high light transmission, low haze and low edge yellowing. However, with regard to their chemical and physical stability toward the influence of chemicals or solvents, these molding compositions are still in need of improvement for some fields of application, for example for use as cosmetics packaging.

It is therefore an object of the present invention to provide thermoplastic molding compositions based on rigid methyl methacrylate polymers, rigid styrenic-vinyl cyanide polymers and flexible graft copolymers, which have improved chemical resistance, for example solvent resistance or water uptake, in combination with comparable mechanical, rheological and optical properties.

Accordingly, the thermoplastic molding compositions defined at the outset have been found, the essence of the invention being that the first graft shell (C2) is obtainable by polymerizing a monomer mixture consisting of
- (C21) from 30 to 39% by weight, based on (C2), of a styrenic monomer,
- (C22) from 61 to 70% by weight, based on (C2), of a $C_1$-$C_8$-alkyl ester of methacrylic acid and
- (C23) from 0 to 3% by weight, based on (C2), of a crosslinking monomer.

Additionally found have been a process for their production, their use for producing moldings and also moldings comprising the inventive thermoplastic molding compositions.

The inventive thermoplastic molding compositions, processes, uses and moldings are described hereinbelow.

The inventive thermoplastic molding compositions comprise
- (A) from 30 to 69% by weight, preferably from 32.5 to 57.5% by weight, based in each case on the sum of components (A), (B) and (C), of a methyl methacrylate polymer obtainable by polymerizing a mixture consisting of
  - (A1) from 90 to 100% by weight, preferably from 92 to 98% by weight, based in each case on (A), of methyl methacrylate, and
  - (A2) from 0 to 10% by weight, preferably from 2 to 8% by weight, based in each case on (A), of a $C_1$-$C_8$-alkyl ester of acrylic acid, and
- (B) from 30 to 69% by weight, preferably from 32.5 to 57.5% by weight, based in each case on the sum of components (A), (B) and (C), of a copolymer obtainable by polymerizing a mixture consisting of
  - (B1) from 75 to 88% by weight, preferably from 79 to 85% by weight, based in each case on (B), of a styrenic monomer and
  - (B2) from 12 to 25% by weight, preferably from 15 to 21% by weight, based in each case on (B), of a vinyl cyanide and
- (C) from 1 to 40% by weight, preferably from 10 to 35% by weight, based in each case on the sum of components (A), (B) and (C), of a graft copolymer obtainable from
  - (C1) from 60 to 90% by weight, preferably from 70 to 80% by weight, based in each case on (C), of a core obtainable by polymerizing a monomer mixture consisting of
    - (C11) from 65 to 90% by weight, preferably from 70 to 85% by weight, based in each case on (C1), of a 1,3-diene and
    - (C12) from 10 to 35% by weight, preferably from 15 to 30% by weight, based in each case on (C1), of a styrenic monomer
  and
  - (C2) from 5 to 20% by weight, preferably from 10 to 15% by weight, based in each case on (C), of a first graft shell obtainable by polymerizing a monomer mixture consisting of (C21) from 30 to 39% by weight, preferably from 30 to 35% by weight, more preferably from 31 to 35% by weight, based in each case on (C2), of a styrenic monomer, (C22) from 61 to 70% by weight, preferably from 63 to 70% by weight, more preferably from 63 to 68% by weight, based in each case on (C2), of a $C_1$-$C_8$-alkyl ester of methacrylic acid and (C23) from 0 to 3% by weight, preferably from 0 to 2% by weight, more preferably from 1 to 2% by weight, based in each case on (C2), of a crosslinking monomer and (C3) from 5 to 20% by weight, preferably from 10 to 15% by weight, based in each case on (C), of a second graft shell obtainable by polymerizing a monomer mixture consisting of (C31) from 70 to 98% by weight, preferably from 75 to 92% by weight, based in each case on (C3), of a $C_1$-$C_8$-alkyl ester of methacrylic acid and (C32) from 2 to 30% by weight, preferably from 8 to 25% by weight, based in each case on (C3), of a $C_1$-$C_8$-alkyl ester of acrylic acid and (D) if desired, customary additives in amounts of up to 20% by weight, preferably from 0 to 10% by weight, based in each case on the sum of components (A), (B) and (C).

The methyl methacrylate polymers (A) used in the inventive thermoplastic molding compositions are either homopolymers of methyl methacrylate (MMA) or copolymers of MMA with up to 10% by weight, based on (A), of a $C_1$-$C_8$-alkyl ester of acrylic acid.

The $C_1$-$C_8$-alkyl ester of acrylic acid (component A2) used may be methyl acrylate, ethyl acrylate, propyl acrylate, n-butyl acrylate, n-pentyl acrylate, n-hexyl acrylate, n-heptyl acrylate, n-octyl acrylate and 2-ethylhexyl acrylate, and also mixtures thereof, preferably methyl acrylate, ethyl acrylate, n-butyl acrylate, 2-ethylhexyl acrylate or mixtures thereof, more preferably methyl acrylate.

The methyl methacrylate (MMA) polymers may be prepared by bulk, solution or bead polymerization by known methods (see, for example, Kunststoff-Handbuch [Plastics Handbook], Volume IX, "Polymethacrylate", Vieweg/Esser, Carl-Hanser-Verlag 1975) and are commercially available. Preference is given to using methyl methacrylate polymers whose weight-average values $M_w$ of the molar masses are in the range from 60 000 to 300 000 g/mol (determined by light scattering in chloroform).

The component (B) is a copolymer of a styrenic monomer (B1) and vinyl cyanide (B2).

The styrenic monomers (component B1) used may be styrene, styrene mono- to trisubstituted by $C_1$-$C_8$-alkyl radicals such as p-methylstyrene or tert-butylstyrene, and also α-methylstyrene, preferably styrene.

The vinyl cyanide (component B2) used may be acrylonitrile and/or methacrylonitrile, preferably acrylonitrile.

Outside the above-specified range of the composition of component (B), opaque molding compositions that have streaks are typically obtained at processing temperatures above 240° C.

The copolymers (B) may be prepared by known processes such as by bulk, solution, suspension or emulsion polymerization, preferably by solution polymerization (see GB-A 14 72 195). Preference is given to copolymers (B) having molar masses $M_w$ of from 60 000 to 300 000 g/mol, determined by light scattering in dimethylformamide.

The component (C) used is a graft copolymer composed of a core (C1) and two graft shells (C2) and (C3) applied thereto.

The core (C1) constitutes the graft base and has a swelling index SI of from 15 to 50, in particular from 20 to 40, determined by swelling measurement in toluene at room temperature.

The 1,3-diene (component C11) of the core of the graft copolymer (component C1) used may be butadiene and/or isoprene.

The styrenic monomer (component C12) used may be styrene or preferably styrene substituted on the ring by one, preferably in the α-position, or else more $C_1$-$C_8$-alkyl group(s), preferably methyl.

The core of the graft copolymer preferably has a glass transition temperature of less than 0° C. The average particle size of the core is in the range from 30 to 250 nm, more preferably in the range from 50 to 180 nm. Typically, the core is prepared by emulsion polymerization (see, for example, Encyclopedia of Polymer Science and Engineering, Vol. 1, p. 401 ff).

To the core (C1) is applied the graft shell (C2) which comprises the monomers (C21), (C22) and, if appropriate, (C23).

The styrenic monomer (component C21) used may be styrene or preferably styrene substituted on the ring by one, preferably in the α-position, or else more $C_1$-$C_8$-alkyl group(s), preferably methyl.

According to the invention, the $C_1$-$C_8$-alkyl ester of methacrylic acid (component C22) used is methyl methacrylate (MMA), ethyl methacrylate, n-, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methylacrylate or 2-ethylhexyl methacrylate, of which particular preference is given to methyl methacrylate, and also mixtures of these monomers.

The monomers (C23) used may be customary crosslinking monomers, i.e. substantially di- or polyfunctional comonomers, especially alkylene glycol di(meth)acrylates such as ethylene glycol di(meth)acrylate, propylene glycol di(meth)acrylate and butylene glycol di(meth)acrylate, allyl methacrylate, (meth)acrylates of glycerol, trimethylolpropane, pentaerythritol or vinylbenzenes such as di- or trivinylbenzene. Preference is given to using butylene glycol dimethacrylate, butylene glycol diacrylate and dihydrodicyclopentadienyl acrylate in the form of an isomer mixture, more preferably dihydrodicyclopentadienyl acrylate in the form of an isomer mixture.

Applied in turn to the graft shell (C2) is a further graft shell (C3) which has the monomers (C31) and (C32). The monomers (C31) are $C_1$-$C_8$-alkyl esters of methacrylic acid, the monomers (C32) are $C_1$-$C_8$-alkyl esters of acrylic acid.

According to the invention, the $C_1$-$C_8$-alkyl ester of methacrylic acid (monomers C31) used is methyl methacrylate (MMA), ethyl methacrylate, n-, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methylacrylate or 2-ethylhexyl methacrylate, of which particular preference is given to methyl methacrylate, and also mixtures of these monomers.

The $C_1$-$C_8$-alkyl ester of acrylic acid (monomers C32) used may be methyl acrylate (MA), ethyl acrylate, propyl acrylate, n-butyl acrylate, isobutyl acrylate, sec-butyl acrylate, tert-butyl acrylate, pentyl acrylate, hexyl acrylate, heptyl acrylate, octyl acrylate or 2-ethylhexyl acrylate, of which particular preference is given to methyl acrylate, and also mixtures of these monomers with one another.

The two graft shells (C2) and (C3) are prepared in the presence of the core (C1) by literature methods, in particular by emulsion polymerization (Encyclopedia of Polymer Science and Engineering, Vol. 1, page 401 ff.). The seed method employed therein applied in the preparation of the two graft shells results in no new particles being formed. In addition, the seed method enables the number and the type of the particles in both graft stages to be determined by the amount and the type of the emulsifier used. The emulsion polymerization is typically initiated by polymerization initiators.

In emulsion polymerization, ionogenic and nonionogenic emulsifiers may be used.

Suitable emulsifiers are, for example, dioctyl sodium sulfosuccinate, sodium lauryl sulfate, sodium dodecylbenzenesulfonate, alkylphenoxypolyethylene sulfonates and salts of long-chain carboxylic and sulfonic acids.

Suitable nonionogenic emulsifiers are, for example, fatty alcohol polyglycol ethers, alkylaryl polyglycol ethers, fatty acid monoethanolamides and also ethoxylated fatty acid amides and amines.

Based on the total weight of the emulsion graft copolymer, the total amount of emulsifier is preferably from 0.05 to 5% by weight.

The polymerization initiators used may be ammonium peroxodisulfates and alkali metal peroxodisulfates such as potassium peroxodisulfate, and also initiator combination systems such as sodium persulfate, sodium hydrosulfite, potassium persulfate, sodium formaldehydesulfoxylate and potassium peroxodisulfate, sodium dithionite-iron(II) sulfate, and the polymerization temperature in the case of the ammonium peroxodisulfates and alkali metal peroxodisulfates that have to be thermally activated is from 50 to 100° C., and, in the case of the initiator combinations that are effective as redox systems, may be lower, for instance in the range from 20 to 50° C.

The total amount of initiator is preferably between 0.02 and 1.0% by weight, based on the finished emulsion polymer.

Both in the preparation of the base stage, i.e. of the core (C1), and in the preparation of the two graft stages, i.e. the two graft shells (C2) and (C3), it is possible also to use polymerization regulators. Useful polymerization regulators include alkyl mercaptans, for example n- or tert-dodecyl mercaptan. The polymerization regulators are used typically in an amount of from 0.01 to 1.0% by weight, based on the particular stage.

Otherwise, the emulsion graft copolymer to be used in accordance with the invention is prepared in such a way that an aqueous mixture consisting of monomers, crosslinker, emulsifier, initiator, regulator and a buffer system is initially charged in a reactor inertized with nitrogen, inertized with stirring under cold conditions and then brought to the polymerization temperature in the course of from 15 to 120 minutes. Subsequently, polymerization is effected up to a conversion of at least 95%. Monomers, crosslinker, emulsifier, initiator and regulator may also be added completely or partly as a feed to the aqueous initial charge.

After a postreaction time of from 15 to 120 minutes if appropriate, the stages (C2) and (C3) are generated by emulsion polymerization by feeding the monomers in the presence of the stage (C1) which has already formed.

The emulsion graft copolymer is isolated from the resulting latex in a known manner by precipitation, filtration and subsequent drying. For the precipitation, it is possible to use, for example, aqueous solutions of inorganic salts such as sodium chloride, sodium sulfate, magnesium sulfate and calcium chloride, aqueous solutions of salts of formic acid such as magnesium formate, calcium formate and zinc formate, aqueous solutions of inorganic acids such as sulfuric acid and phosphoric acid and also aqueous ammoniacal and aminic solutions and also other aqueous alkaline solutions, for example of sodium hydroxide and potassium hydroxide. However, the precipitation may also be effected by physical methods, for example freeze precipitation, shear precipitation, vapor precipitation.

The drying may also be effected, for example, by freeze-drying, spray-drying, fluidized-bed drying and forced air drying.

The precipitated emulsion graft copolymer may also be further processed without drying.

The graft copolymer (C) preferably has a swelling index SI of from 10 to 40, in particular from 12 to 35. The swelling index is determined by measurement of swelling in toluene at room temperature.

Useful as customary additives (D) are any substances that are readily soluble in components (A), (B) and (C), or are readily miscible with them. Suitable additives include dyes, stabilizers, lubricants and antistats.

The inventive molding compositions are prepared from components (A), (B), (C) and, if desired, (D) by processes known to those skilled in the art, for example by mixing the components in the melt using apparatus known to those skilled the art at temperatures in the range from 200 to 300° C., in particular from 200 to 280° C.

Another feature of the inventive thermoplastic molding compositions is that the weight ratio of the first graft shell (C2) to the second graft shell (C3) is in the range from 2:1 to 1:2.

In a preferred embodiment, a feature of the inventive thermoplastic molding compositions is that the refractive index $(n_D\text{–}C_2)$ of the first graft shell (C2) is greater than the refractive index $(n_D\text{–}C_3)$ of the second graft shell (C3). The refractive index $(n_D\text{–}C_2)$ of the first graft shell (C2) is preferably at least 2%, in particular at least 3%, greater than the refractive index $(n_D\text{–}C_3)$ of the second graft shell (C3).

In a further preferred embodiment, a characteristic of the inventive thermoplastic molding compositions is that the refractive index $(n_D\text{–}C_2C_3)$ of the overall graft shell is less than the refractive index $(n_D\text{–}C_1)$ of the core (C1). The refractive index $(n_D\text{–}C_2C_3)$ of the overall graft shell is preferably at least 0.1%, in particular at least 1.0%, less than the refractive index $(n_D\text{–}C_1)$ of the core (C1).

In a further preferred embodiment, a characteristic of the inventive thermoplastic molding compositions is that the magnitude of the difference of refractive index $(n_D\text{–}C)$ of the overall component (C) and the refractive index $(n_D\text{–}AB)$ of the overall matrix of components (A) and (B) is less than or equal to 0.02, in particular less than or equal to 0.015.

In a further preferred embodiment, an additional characteristic of the inventive molding compositions is that the magnitude of the difference between the refractive index $(n_D\text{–}C_2C_3)$ of the overall graft shell of graft copolymer C and the refractive index $(n_D\text{–}C_1)$ of the core (C1) is less than 0.06. The molding compositions of this embodiment feature particularly low edge yellowing.

The refractive indices mentioned are each to be determined by the methods that will be specified hereinbelow (see examples).

The inventive thermoplastic molding compositions may be used to produce moldings principally by injection molding or by blow molding. However, the thermoplastic molding compositions may also be pressed, calendered, extruded or vacuum-molded. Particular features of the inventive thermoplastic molding compositions are their good mechanical, rheological and optical properties, and also improved chemical resistance, for example solvent resistance or water uptake.

EXAMPLES

In the following inventive examples and the comparative examples, thermoplastic molding compositions were in each case produced and the following properties were determined:

Refractive Index $n_D$ [Dimensionless]:

The refractive indices $(n_D-C_1)$, $(n_D-C)$ and $(n_D-AB)$ were measured on films that had been prepressed from the particular polymer cores (C1), polymers (C) or polymer mixtures of components (A) and (B) in an IWK press at 200° C. and a pressure of 3-5 bar for 2 min and finally afterpressed at 200° C. and 200 bar for 3 min. The measurements were carried out at 20° C. using a Abbé refractometer by the method for measuring refractive indices in the solid state (see Ullmanns Encyklopädie der technischen Chemie, Volume 2/1, p. 486, publisher E. Foerst; Urban & Schwarzenberg, Munich-Berlin 1961).

The refractive index $(n_D-C_2)$ was calculated incrementally by the following formula:

$$(n_D - C_2) = \sum_{i=1}^{n} [x_i^{C2} * (nD - M_i^{C2})] / \sum_{i=1}^{n} [x_i^{C2}]$$

where $x_i^{C2}$ are the parts by weight of the monomer component $M_i^{C2}$ forming the structure of the graft shell (C2), $(nD-M_i^{C2})$ is the refractive index increment of the monomer component $M_i^{C2}$ forming the structure of the graft shell (C2), and n is the number of different monomer components forming the structure of the graft shell (C2).

The refractive index $(n_D-C_3)$ was calculated incrementally by the following formula:

$$(n_D - C_3) = \sum_{i=1}^{n} [x_i^{C3} * (nD - M_i^{C3})] / \sum_{i=1}^{n} [x_i^{C3}]$$

where $x_i^{C3}$ are the parts by weight of the monomer component $M_i^{C3}$ forming the structure of the graft shell (C3), $(nD-M_i^{C3})$ is the refractive index increment of the monomer component $M_i^{C3}$ forming the structure of the graft shell (C3), and n is the number of different monomer components forming the structure of the graft shell (C3).

The refractive index increments $(nD-M_i^{C2})$ and $(nD-M_i^{C3})$ of the monomer components $M_i^{C2}$ and $M_i^{C3}$ respectively forming the structure of the graft shells (C2) and (C3) respectively used were the following values:
Styrene: 1.594
Methyl methacrylate: 1.495
Butyl acrylate: 1.419
Dihydrodicyclopentadienyl acrylate: 1.497
Butanediol diacrylate: 1.419
Butylene glycol dimethacrylate: 1.419

The refractive index $(n_D-C_2C_3)$ of the overall graft shell was calculated by the following formula:

$$(n_D-C_2C_3)=[y^{C2}*(n_D-C_2)+y^{C3}*(n_D-C_3)]/[y^{C2}+y^{C3}]$$

where $y^{C2}$ and $y^{C3}$ are the particular parts by weight of the first graft shell (C2) and second graft shell (C3), respectively, forming the structure of the overall graft shell, and the refractive indices $(n_D-C_2)$ and $(n_D-C_3)$ were determined as described above.

Swelling Index SI [Dimensionless]:

The swelling index SI of the graft core polymer (C1) was measured on films that were obtained by drying the dispersion obtained in the production, to be described hereinbelow, of the rubber cores (C1) at 50° C. and 700-800 mbar overnight. The swelling index SI of the graft copolymer (C) was measured on films that were prepressed from the graft copolymers (C) in an IWK press at 200° C. and a pressure of 3-5 bar for 2 min and finally afterpressed at 200° C. and 200 bar for 3 min. A piece of the particular films was admixed with toluene. After 24 hours, the toluene was decanted and the swollen film weighed. The swollen film was dried to constant weight at up to 120° C. under reduced pressure and weighed again. The swelling index is the quotient of the weight of the swollen film and the weight of the dried film.

Impact Strength $a_n$ [kJ/m$^2$]:

The impact strength $a_n$ was determined to ISO 179-2/1eU at 23° C.

Notched Impact Strength $a_k$ [kJ/m$^2$]:

The notched impact strength $a_k$ was determined to ISO 179-2/1eA(F) at 23° C.

Puncture Resistance PR [Nm]:

The puncture resistance PR was determined to ISO 6603-2/40/20/C at 23° C. on sheets having a thickness of 2 mm.

Melt Volume Rate MVR [ml/10 min]:

The melt volume rate MVR 220/10 was determined to DIN EN ISO 1133 as a measure of the flowability.

Vicat B50 Heat Distortion Resistance [° C.]:

The Vicat B50 heat distortion resistance was determined to ISO 306: 1994.

Transmission [%]:

The transmission was determined to DIN 53236 on sheets having a thickness of 2 mm.

Haze [%]

The haze value was determined to ASTM D 1003 on specimens having a thickness of 2 mm as a measure of the opacity.

Yellowness Index YI [Dimensionless]:

The yellow index (yellowing) or yellowness index YI was determined to ASTM D 1925-70 C/10°.

Particle Size $D_{50}$ and $D_{90}$ [nm]:

The average particle size and the particle size distribution of the graft copolymer cores (C1) were determined from the integral mass distribution. The average particle sizes are in all cases the weight average of the particle sizes, as determined by means of an analytical ultracentrifuge in accordance with the method of W. Scholtan and H. Lange, Kolloid-Z, und Z.-Polymere 250 (1972), pages 782 to 796. The ultracentrifuge measurement affords the integral mass distribution of the particle diameter of a sample. From this, it can be inferred how many percent by weight of the particles have a diameter equal to or less than a certain size. The average particle diameter, which is also designated as the $D_{50}$ value of the integral mass distribution, is defined as the particle diameter at which 50% by weight of the particles have a smaller diameter than the diameter that corresponds to the $D_{50}$ value. Equally, 50% by weight of the particles then have a greater diameter than the $D_{50}$ value. The $D_{90}$ value is defined as the particle diameter at which 90% by weight of the particles have a smaller diameter than the diameter that corresponds to the $D_{90}$ value.

Water Uptake:

Specimens were produced from the molding compositions and stored in water at 20° C. for 16 h, or at 70° C. for 6 h. The visual appearance of the specimens was subsequently assessed visually and assigned to one of the categories "very good" (++), "good" (+), "adequate" (o), "poor" (−) or "very poor" (−−).

Chemical Resistance:

Specimens were produced from the molding compositions and stored in various media (ethanol, isopropanol, olive oil-oleic acid mixture or diisododecyl phthalate). In each case before and after the storage, the stress cracking behavior (tested to ISO 4600-1992, Method B, sphere impression test) and also strength, stiffness and elongation at break (measured to ISO 527 tensile test, elongation at break) were determined on the specimens. The particular change in the properties measured, caused by the storage, was assessed and assigned to one of the categories "very good" (++), "good" (+), "adequate" (o), "poor" (−) or "very poor" (−−).

Preparation of the Molding Compositions:

The component A used was a copolymer of 95.5% by weight of methyl methacrylate and 4.5% by weight of methyl acrylate having a viscosity number VN of 70 ml/g (determined as a 0.5% by weight solution in dimethylformamide at 23° C. to DIN 53727).

The component B used was a copolymer of 81% by weight of styrene and 19% by weight of acrylonitrile having a viscosity number VN of 60 ml/g (determined as a 0.5% by weight solution in dimethylformamide at 23° C. to DIN 53727).

The components C were prepared as follows:

In a first stage, graft cores C1 were prepared by in each case initially inertizing a solution of 186 parts by weight of water, 0.36 part by weight of sodium bicarbonate, 0.30 part by weight of potassium peroxodisulfate and 0.55 part by weight of potassium stearate with nitrogen and heating to 70° C. Subsequently, a mixture of 1 part by weight of tert-dodecyl mercaptan and 100 parts by weight of a mixture of butadiene and styrene (the particular composition of the butadiene-styrene mixture can be taken from Table 1) was added with stirring within 5 h. Polymerization was effected up to a conversion of at least 95%.

The graft cores C1 obtained in this way from 73% by weight of butadiene and 27% by weight of styrene have an average particle diameter $D_{50}$ of 130 nm and a swelling index SI of 23.

The graft cores C1 obtained in this way from 70% by weight of butadiene and 30% by weight of styrene have an average particle diameter $D_{50}$ of 140 nm and a swelling index SI of 31.

For molding composition C4 (see Table 1), the procedure described for preparing the graft core C1 was modified in accordance with the teaching of WO 01/46317 in such a way that graft cores having a bimodal particle size distribution were formed; the maxima of the particle size distribution were at 80 and 150 nm.

From the reaction mixtures comprising the graft cores C1, prepared in the first stage, the graft copolymers C were in each case prepared by two-stage graft copolymerization in the manner described below.

In the description, the following abbreviations were used:

| Bu | Butadiene | MA | Methyl acrylate |
|---|---|---|---|
| S | Styrene | BDDA | Butanediol diacrylate |
| MMA | Methyl methacrylate | BA | Butyl acrylate |
| BGDMA | Butylene glycol dimethacrylate | DCPA | Dihydrodicyclopentadienyl acrylate |

The reaction mixture containing the parts by weight of graft cores C1 specified in each case in Table 1 was initially charged and inertized with nitrogen. Subsequently, in each case 0.1 part by weight of potassium stearate and 0.04 part by weight of potassium peroxodisulfate in 10 parts by weight of water were added. This mixture was admixed, in each case at 70° C. within 1.5 h, with the parts by weight specified in Table 1 of a mixture of the monomers forming the structure of the first graft shell C2, the latter mixture in each case consisting of the parts by weight specified in Table 1 of S, MMA, DCPA, BDDA and BGDMA. On completion of addition, the polymerization was continued for 15 min until the first graft shell C2 had formed.

The parts by weight specified in Table 1 of a mixture of the monomers forming the structure of the second graft shell C3 was in each case added to the thus obtained reaction mixture within 1.5 h, said mixture consisting of the parts by weight of MMA and BA specified in each case in Table 1. The polymerization was subsequently continued for 60 minutes to form the second graft shell C3. Subsequently, in each case a further 0.04 part by weight of potassium peroxodisulfate in 10 parts by weight of water was added and the mixture was polymerized for a further 1.5 h.

Afterward, the thus obtained graft copolymers C were isolated by precipitation with a 1% by weight magnesium sulfate solution and, after the washing with water, dried at 60° C. under reduced pressure for 24 hours.

The parts by weight specified in Table 1 of components A, B, C, and in each case 0.2 part by weight of calcium stearate in a melt at temperatures of 250° C. were used to produce the inventive molding compositions 1-4 reproduced in Table 1 and the molding compositions C1-C4 serving for comparison.

TABLE 1

| Molding composition***** | A* | B* | C* | C1** | Composition C1*** | C2** | Composition C2*** | C3** | Composition C3*** |
|---|---|---|---|---|---|---|---|---|---|
| 1 | 35.4 | 37.4 | 27 | 80 | 73 Bu - 27 S | 10 | 32.7 S - 65.3 MMA -2 DCPA | 10 | 85 MMA - 15 BA |
| 2 | 34.8 | 38.0 | 27 | 80 | 70 Bu - 30 S | 10 | 30 S - 68 MMA - 2 DCPA | 10 | 85 MMA - 15 BA |
| 3 | 36.5 | 34.8 | 28.5 | 75 | 73 Bu - 27 S | 15 | 30.7 S - 67.3 MMA -2 DCPA | 10 | 80 MMA - 20 BA |
| 4 | 35.5 | 34.3 | 30 | 70 | 70 Bu - 30 S | 15 | 35 S - 63 MMA -2 DCPA | 15 | 90 MMA - 10 BA |
| C1 | 34.9 | 37.9 | 27 | 80 | 73 Bu - 27 S | 10 | 52 S - 47 MMA -1 BDDA | 10 | 80 MMA - 20 BA |

Composition C

TABLE 1-continued

| Molding composition***** | A* | B* | C* | C1** | Composition C1*** | C2** | Composition C2*** | C3** | Composition C3*** |
|---|---|---|---|---|---|---|---|---|---|
| | | | | | Composition C | | | | |
| C2 | 34.9 | 37.9 | 27 | 80 | 73 Bu - 27 S | 10 | 51.5 S - 46.5 MMA -2 DCPA | 10 | 80 MMA - 20 BA |
| C3 | 35.0 | 37.8 | 27 | 80 | 73 Bu - 27 S | 10 | 51.5 S - 46.5 MMA -2 BDDA | 10 | 80 MMA - 20 BA |
| C4**** | 34.4 | 38.4 | 27 | 80 | 70 Bu - 30 S | 10 | 40 S - 58 MMA -2 BGDMA | 10 | 80 MMA - 20 BA |

*Parts by weight of components A, B and C of which the molding compositions consist (each molding composition also contains 0.2 part by weight of calcium stearate), the sum of the parts by weight of A, B, C and calcium stearate adding up to 100.
**Parts by weight of components C1, C2 and C3 of which the graft copolymers C consist, the sum of the parts by weight of C1, C2 and C3 adding up to 100.
***Parts by weight and type of the monomers of which the particular components C1, C2 and C3 consist, the particular sum of the monomers adding up to 100 (Bu = 1,3-butadiene, MA = methyl acrylate, S = styrene, BDDA = butanediol diacrylate, MMA = methyl methacrylate, BA = butyl acrylate, BGDMA = butylene glycol dimethacrylate, DCPA = dihydrodicyclopentadienyl acrylate)
****Graft copolymer core C1 having bimodal particle size distribution
*****Moving compositions designated by C are noninventive and serve for comparison.

Components (A) and (B) formed the matrix of the molding compositions; component (C) constituted the rubber.

The following Table 2 lists the particular ratio of the parts by weight (C2):(C3), the refractive indices ($n_D$–$C_2$) of the first graft shell (C2), the refractive indices ($n_D$–$C_3$) of the second graft shell (C3) and the refractive indices ($n_D$–$C_2C_3$) of the overall graft shell, and also the refractive indices ($n_D$–$C_1$) of the cores (C1) and the refractive indices ($n_D$–C) of the overall components (C) for the inventive molding compositions 1 to 4 and for the molding compositions C1 to C4 serving for comparison. The contributions of the particular differences between the refractive indices ($n_D$–C) of the overall components (C) and the refractive indices ($n_D$–AB) of the overall matrix of components (A) and (B) for all molding compositions 1 to 4 and C1 to C4 are less than 0.02.

TABLE 2

| Molding compo- sition ***** | (C2):(C3) | ($n_D$-$C_2$) | ($n_D$-$C_3$) | ($n_D$-$C_2C_3$) | ($n_D$-$C_1$) | ($n_D$-C) |
|---|---|---|---|---|---|---|
| 1 | 10/10 | 1.5274 | 1.4836 | 1.5055 | 1.5403 | 1.5340 |
| 2 | 10/10 | 1.5247 | 1.4836 | 1.5042 | 1.5426 | 1.5351 |
| 3 | 15/10 | 1.5254 | 1.4798 | 1.5072 | 1.5403 | 1.5311 |
| 4 | 15/15 | 1.5297 | 1.4874 | 1.5085 | 1.5426 | 1.5329 |
| C1 | 10/10 | 1.5457 | 1.4798 | 1.5128 | 1.5403 | 1.5336 |
| C2 | 10/10 | 1.5460 | 1.4798 | 1.5129 | 1.5403 | 1.5353 |
| C3 | 10/10 | 1.5445 | 1.4798 | 1.5121 | 1.5403 | 1.5355 |
| C4 | 10/10 | 1.5331 | 1.4798 | 1.5064 | 1.5426 | 1.5342 |

***** Molding compositions designated by C are noninventive and serve for comparison.

The following Table 3 reproduces the mechanical, rheological and optical properties and also the chemical resistance both for the inventive molding compositions 1 to 4 and for the molding compositions C1 to C4 serving for comparison.

TABLE 3

| Molding composition | 1 | 2 | 3 | 4 | C1 | C2 | C3 | C4 |
|---|---|---|---|---|---|---|---|---|
| $a_n$ [kJ/m$^2$] | 103.5 | 99.8 | 117.0 | 123.0 | 103.2 | 107.5 | 101.5 | 84.2 |
| $a_k$ [kJ/m$^2$] | 14.6 | 15.9 | 16.3 | 15.3 | 9.7 | 10.7 | 12.6 | 8.3 |
| Puncture resistance PR [Nm] | 16.6 | 17.6 | 16.2 | 18.7 | 16.0 | 13.4 | 10.4 | 16.5 |
| MVR [ml/10 min] | 14.6 | 10.1 | 11.0 | 12.1 | 10.5 | 12.5 | 11.3 | 10.7 |
| Vicat B50 [° C.] | 95.4 | 94.2 | 92.0 | 90.8 | 91.3 | 93.4 | 92.1 | 91.1 |
| Transmission [%] | 87.3 | 85.5 | 87.7 | 86.4 | 84.1 | 85.3 | 85.4 | 82.4 |
| Haze [%] | 6.3 | 8.4 | 7.8 | 8.7 | 8.9 | 8.1 | 9.3 | 15.2 |
| Yellowness YI | 6.9 | 8.2 | 9.4 | 9.8 | 10.2 | 9.4 | 10.7 | 17.7 |
| Water storage at 20° C. for 16 h* | + | + | + | + | o | o | o | o |
| Water storage at 70° C. for 6 h* | o | o | o | o | o | o | o | – |
| Chemical resistance to ethanol* | ++ | ++ | ++ | + | o | o | o | o |
| Chemical resistance to isopropanol* | ++ | ++ | ++ | + | – | o | o | o |
| Chemical resistance to olive oil/oleic acid* | ++ | ++ | ++ | + | – – | – | – | – |
| Chemical resistance to diisododecyl phthalate* | ++ | ++ | ++ | + | – | – | – | – |

*++ very good, + good, o adequate, – poor, – – very poor

The examples demonstrate the improved chemical resistance, for example solvent resistance or water uptake, combined with comparable mechanical, rheological and optical properties, of the inventive thermoplastic molding compositions compared to existing molding compositions.

What is claimed is:

1. A thermoplastic molding composition, comprising a mixture of
    (A) from 30 to 69% by weight, based on the sum of components (A), (B) and (C), of a methyl methacrylate polymer obtainable by polymerizing a mixture consisting of
        (A1) from 90 to 100% by weight, based on (A), of methyl methacrylate, and
        (A2) from 0 to 10% by weight, based on (A), of a $C_1$-$C_8$-alkyl ester of acrylic acid, and
    (B) from 30 to 69% by weight, based on the sum of components (A), (B) and (C), of a copolymer obtainable by polymerizing a mixture consisting of
        (B1) from 75 to 88% by weight, based on (B), of a styrenic monomer and
        (B2) from 12 to 25% by weight, based on (B), of a vinyl cyanide
    and
    (C) from 1 to 40% by weight, based on the sum of components (A), (B) and (C), of a graft copolymer obtainable from
        (C1) from 60 to 90% by weight, based on (C), of a core obtainable by polymerizing a monomer mixture consisting of
            (C11) from 65 to 90% by weight, based on (C1), of a 1,3-diene and
            (C12) from 10 to 35% by weight, based on (C1), of a styrenic monomer
        and
        (C2) from 5 to 20% by weight, based on (C), of a first graft shell and
        (C3) from 5 to 20% by weight, based on (C), of a second graft shell obtainable by polymerizing a monomer mixture consisting of
            (C31) from 70 to 98% by weight, based on (C3), of a $C_1$-$C_8$-alkyl ester of methacrylic acid and
            (C32) from 2 to 30% by weight, based on (C3), of a $C_1$-$C_8$-alkyl ester of acrylic acid
    and
    (D) optionally, customary additives in amounts of up to 20% by weight, based on the sum of components (A), (B) and (C),
    with the proviso that the weight ratio of (C2) to (C3) is in the range from 2:1 to 1:2,
    wherein the first graft shell (C2) is obtainable by polymerizing a monomer mixture consisting of
        (C21) from 30 to 35% by weight, based on (C2), of a styrenic monomer,
        (C22) from 63 to 70% by weight, based on (C2), of a $C_1$-$C_8$-alkyl ester of methacrylic acid and
        (C23) from 0 to 20% by weight, based on (C2), of a crosslinking monomer.

2. The thermoplastic molding composition according to claim 1, wherein the refractive index ($n_D$–$C_2$) of the first graft shell (C2) is greater than the refractive index ($n_D$–$C_3$) of the second graft shell (C3), and the refractive index ($n_D$–$C_2C_3$) of the overall graft shell is less than the refractive index ($n_D$–$C_1$) of the core (C1), and the magnitude of the difference of the refractive index ($n_D$–C) of the overall component (C) and the refractive index ($n_D$–AB) of the overall matrix of components (A) and (B) is less than or equal to 0.02.

3. The thermoplastic molding composition according to claim 1, wherein the first graft shell (C2) is obtainable by polymerizing a monomer mixture consisting of
    (C21) from 31 to 35% by weight, based on (C2), of a styrenic monomer,
    (C22) from 63 to 68% by weight, based on (C2), of a $C_1$-$C_8$-alkyl ester of methacrylic acid and
    (C23) from 1 to 2% by weight, based on (C2), of a crosslinking monomer.

4. The thermoplastic molding composition according to claim 1, wherein the magnitude of the difference between the refractive index ($n_D$–$C_2C_3$) of the overall graft shell of the graft copolymer C and the refractive index ($n_D$–$C_1$) of the core (C1) is less than 0.06.

5. The thermoplastic molding composition according to claim 1, wherein the styrenic monomer used is styrene.

6. The thermoplastic molding composition according to claim 1, wherein the graft copolymer (C) has a swelling index SI of from 10 to 40.

7. A process for producing thermoplastic molding compositions according to claim 1, which comprises
    (A) from 30 to 69% by weight, based on the sum of components (A), (B) and (C), of a methyl methacrylate polymer obtainable by polymerizing a mixture consisting of
        (A1) from 90 to 100% by weight, based on (A), of methyl methacrylate, and
        (A2) from 0 to 10% by weight, based on (A), of a $C_1$-$C_8$-alkyl ester of acrylic acid, and
    (B) from 30 to 69% by weight, based on the sum of components (A), (B) and (C), of a copolymer obtainable by polymerizing a mixture consisting of
        (B1) from 75 to 88% by weight, based on (B), of a styrenic monomer and
        (B2) from 12 to 25% by weight, based on (B), of a vinyl cyanide
    and
    (C) from 1 to 40% by weight, based on the sum of components (A), (B) and (C), of a graft copolymer obtainable from
        (C1) from 60 to 90% by weight, based on (C), of a core obtainable by polymerizing a monomer mixture consisting of
            (C11) from 65 to 90% by weight, based on (C1), of a 1,3-diene and
            (C12) from 10 to 35% by weight, based on (C1), of a styrenic monomer
        and
        (C2) from 5 to 20% by weight, based on (C), of a first graft shell obtainable by polymerizing a monomer mixture consisting of
            (C21) from 30 to 35% by weight, based on (C2), of a styrenic monomer,
            (C22) from 63 to 70% by weight, based on (C2), of a $C_1$-$C_8$-alkyl ester of methacrylic acid and
            (C23) from 0 to 2% by weight, based on (C2), of a crosslinking monomer
        and
        (C3) from 5 to 20% by weight, based on (C), of a second graft shell obtainable by polymerizing a monomer mixture consisting of
            (C31) from 70 to 98% by weight, based on (C3), of a $C_1$-$C_8$-alkyl ester of methacrylic acid and
            (C32) from 2 to 30% by weight, based on (C3), of a $C_1$-$C_8$-alkyl ester of acrylic acid and
(D) optionally, customary additives in amounts of up to 20% by weight, based on the sum of components (A), (B) and (C), with the proviso that the weight ratio of (C2) to (C3) is in the range from 2:1 to 1:2, by mixing components (A), (B), (C) and, where present, (D) in the melt.

8. A molding comprising the thermoplastic molding composition according to claim 1.

9. The thermoplastic molding composition according to claim 2, wherein the first graft shell (C2) is obtainable by polymerizing a monomer mixture consisting of
(C21) from 31 to 35% by weight, based on (C2), of a styrenic monomer,
(C22) from 63 to 68% by weight, based on (C2), of a $C_1$-$C_8$-alkyl ester of methacrylic acid and
(C23) from 1 to 2% by weight, based on (C2), of a crosslinking monomer.

10. The thermoplastic molding composition according to claim 2, wherein the magnitude of the difference between the refractive index ($n_D$–$C_2C_3$) of the overall graft shell of the graft copolymer C and the refractive index ($n_D$–$C_1$) of the core (C1) is less than 0.06.

11. The thermoplastic molding composition according to claim 3, wherein the magnitude of the difference between the refractive index ($n_D$–$C_2C_3$) of the overall graft shell of the graft copolymer C and the refractive index ($n_D$–$C_1$) of the core (C1) is less than 0.06.

12. The thermoplastic molding composition according to claim 2, wherein the styrenic monomer used is styrene.

13. The thermoplastic molding composition according to claim 3, wherein the styrenic monomer used is styrene.

14. The thermoplastic molding composition according to claim 4, wherein the styrenic monomer used is styrene.

\* \* \* \* \*